United States Patent
Leu

(10) Patent No.: US 6,357,168 B1
(45) Date of Patent: Mar. 19, 2002

(54) SAFETY FISHHOOK

(76) Inventor: James M. Leu, 4103 Hidden Meadows Dr., Arnold, MO (US) 63010

( * ) Notice: Subject to any disclaimer, the term of this patent is extended or adjusted under 35 U.S.C. 154(b) by 0 days.

(21) Appl. No.: 09/535,760

(22) Filed: Mar. 28, 2000

(51) Int. Cl.$^7$ ............................................. A01K 83/00
(52) U.S. Cl. ..................................................... 43/43.16
(58) Field of Search ........................................ 43/43.16

(56) References Cited

U.S. PATENT DOCUMENTS

| | | | | |
|---|---|---|---|---|
| 377,033 A | * | 1/1888 | Kerrison, Jr, | 43/43.16 |
| 627,179 A | * | 6/1899 | Dreese | 43/43.16 |
| 648,552 A | * | 5/1900 | Crane | 43/43.16 |
| 1,706,881 A | * | 3/1929 | Hampson | 43/43.16 |
| 2,164,807 A | * | 7/1939 | Evans | 43/43.16 |
| 2,266,725 A | * | 12/1941 | Andrews | 43/43.16 |
| 2,531,981 A | * | 11/1950 | Liebe | 43/43.16 |
| 2,719,380 A | * | 10/1955 | Place | 43/44.8 |
| 2,750,704 A | * | 6/1956 | Bemis | 43/43.16 |
| 2,865,131 A | * | 12/1958 | Ellis | 43/43.16 |
| 3,023,536 A | * | 3/1962 | Williams | 43/43.2 |
| 3,130,514 A | * | 4/1964 | Cornick | 43/43.16 |
| 141,910 A | * | 8/1973 | Allen | 43/43.16 |
| 4,802,300 A | * | 2/1989 | Fujii et al. | 43/43.16 |
| 4,914,852 A | * | 4/1990 | Hnizdor | 43/44.82 |
| 5,526,603 A | * | 6/1996 | Fujii et al. | 43/43.16 |
| 6,006,467 A | * | 12/1999 | Ulrich | 43/43.16 |
| 6,189,257 B1 | * | 2/2001 | Ulrich | 43/43.16 |

* cited by examiner

*Primary Examiner*—Darren W. Ark
(74) *Attorney, Agent, or Firm*—Haverstock, Garrett & Roberts LLP

(57) ABSTRACT

A safety fishhook which substantially prevents skin punctures is formed from a wire and includes a first end adapted for attachment to a line, a shank adjacent to the first end, and a curved bend extending from the shank to a free end, the curved bend defining partially enclosing a planar area, and the free end terminating within the area and being oriented at a safe angle with respect to a line bounding the curved bend and the first end.

8 Claims, 2 Drawing Sheets

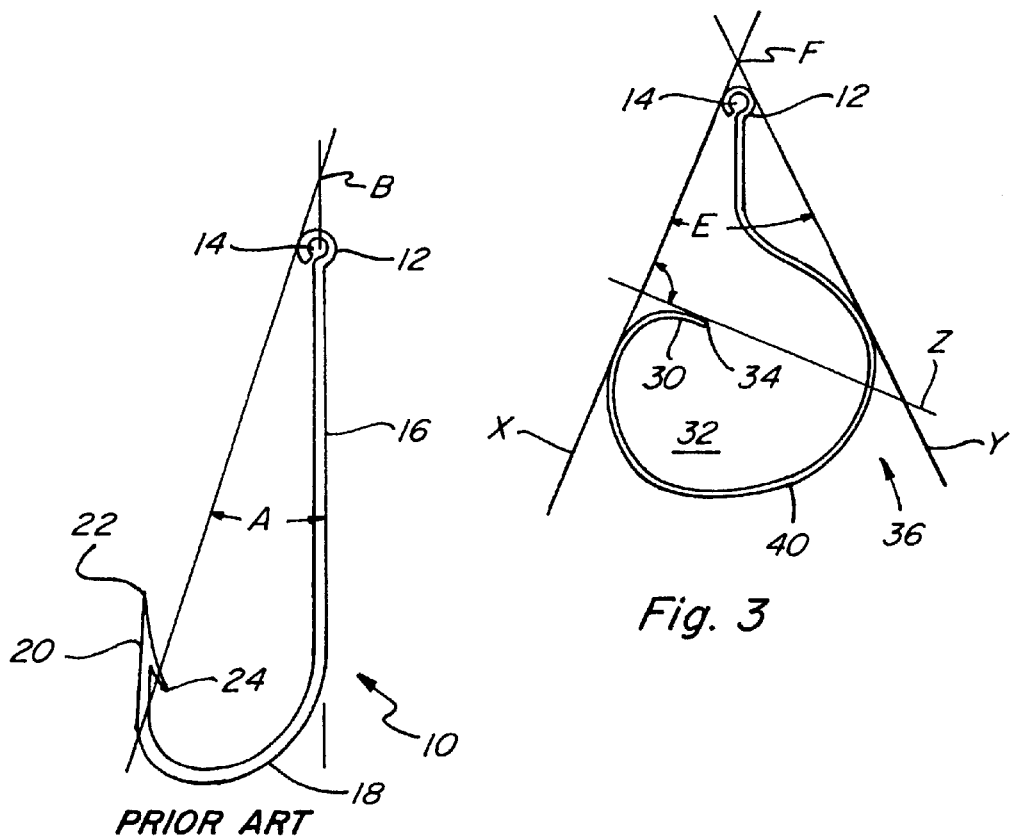
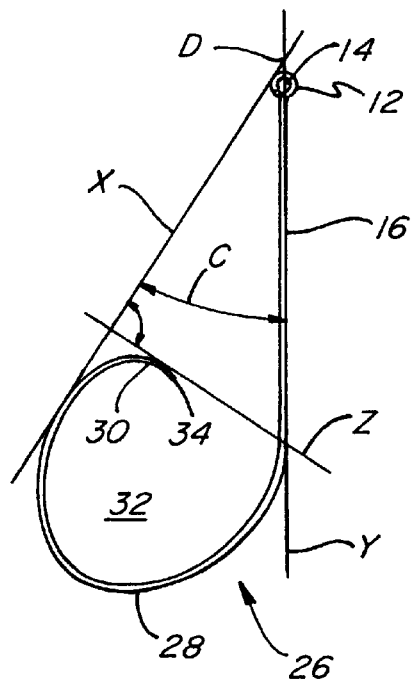
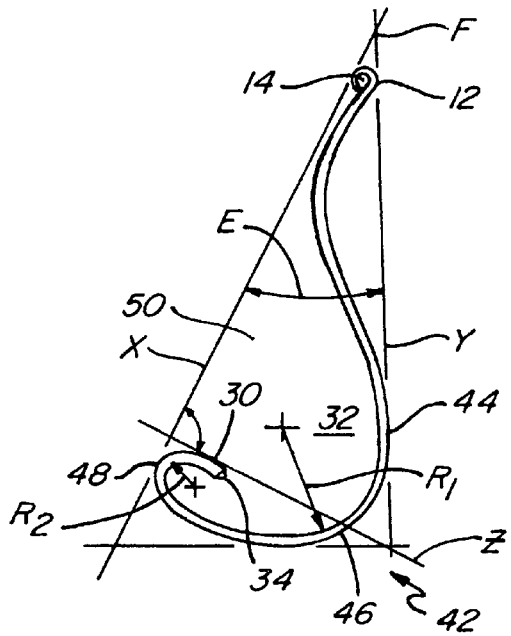
Fig. 1 PRIOR ART
Fig. 2
Fig. 3
Fig. 4

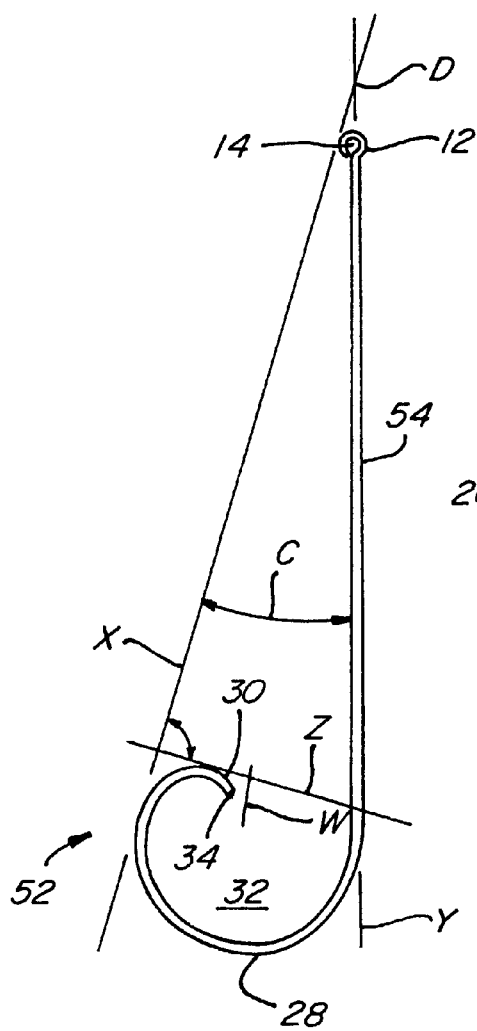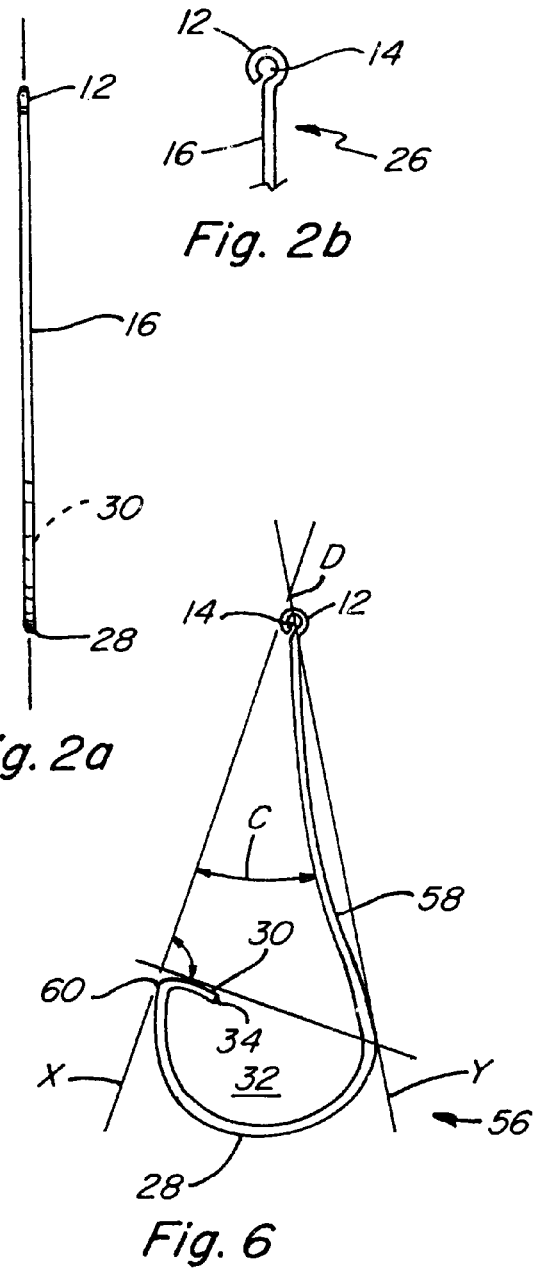
Fig. 2b
Fig. 2a
Fig. 5
Fig. 6

SAFETY FISHHOOK

TECHNICAL FIELD

This invention relates generally to a fishhook, and in particular, to a safety fishhook adapted for attachment to a fishing line for casting and retrieval, the fishhook having a free or terminal end opposite the line that is adapted to be pulled across a person's skin by the line without puncturing or otherwise entering or injuring the skin.

BACKGROUND ART

When fishing, it is common to use fishhooks including outwardly extending, sharply pointed and usually barbed ends attached to the fishing line and holding a bait or lure. When fishing with children, and particularly when teaching a child to fish, there is a heightened danger that a fishhook will puncture the skin of a child, a parent or other person assisting the child, an on-looker, or other nearby person when the child casts and retrieves the bait or lure. There is also a danger of a puncture wound when handling the hook for attaching it to the fishing line, baiting the hook, and removing a fish caught on the hook. The resultant puncture wounds can be serious, particularly when in the eye or face, and can have serious consequences when the injury occurs at a remote location far from medical assistance.

Therefore, what is required is a fishhook which is safer in the context of being less apt to puncture the skin of a person when handling or accidentally contacted by the fishhook.

DISCLOSURE OF THE INVENTION

According to one aspect of the present invention, a safety fishhook which substantially prevents skin punctures is disclosed. The present safety fishhook is formed from a wire and includes a first end adapted for attachment to a line, a shank adjacent to the first end, and a curved bend extending from the shank to a free end, the first end and the curved bend being bounded by a line, and the free end extending toward said curved bend at an angle to said line of at least about 90 degrees.

According to a preferred aspect of the invention, the curved bend defines and partially encloses a planar area, and the free end terminates within the area.

According to another preferred aspect of the invention, the curved bend is bounded by a second line which intersects the first named line in the vicinity of or near the first end forming an angle, the free end terminating at a location near a center or central region of the angle.

The location of the free end of the present fishhook is an important advantage from a safety perspective as it presents less of a potential puncture or injury hazard when handled or passed over a person's skin, such as when being baited, cast, or retrieved, while still being adequately positioned for hooking or retaining a fish that bites or takes the bait in its mouth.

According to still another preferred aspect of the invention, the curved bend includes a first curved portion having a first radius of curvature and a second curved portion having a second radius of curvature, the first curved portion being located closer to the shank and the second curved portion being located closer to the free end, the first radius of curvature being greater than the second radius of curvature. This configuration is advantageous as it provides a somewhat larger opening communicating with the area defined by the curved portions, to enable the free end to receive a larger bait and to make it easier for a fish to put its mouth around the bait.

BRIEF DESCRIPTION OF THE DRAWINGS

FIG. 1 is a side elevational view of a typical prior art fishhook;

FIG. 2 is a side elevational view of a fishhook according to the present invention;

FIG. 2a is an end view of the fishhook of FIG. 2;

FIG. 2b is a fragmentary end view of the fishhook of FIG. 2, showing an alternative orientation of an eyelet thereof;

FIG. 3 is a side elevational view of another fishhook according to the present invention, including a shorter shank portion;

FIG. 4 is a side elevational view of another fishhook according to the present invention having a curved shank;

FIG. 5 is a side elevational view of a fishhook according to the invention, having an elongate shank; and FIG. 6 is a side elevational view of another fishhook according to the invention, having a variant of an elongate shank.

BEST MODE FOR CARRYING OUT THE INVENTION

Referring now to the drawings, FIG. 1 shows a typical prior art fishhook 10. Fishhook 10 is formed from a wire in the well known conventional manner and includes a first end 12 including an eyelet 14, an elongate shank 16 and a curved bend 18 terminating at a free end 20 including an endmost point 22 and a barb 24. First end 12 is adapted for attachment to a fishing line (not shown) in the well known conventional manner, i.e., by tying, or hooking or clipping using a swivel or the like. Free end 20 is adapted for receiving and holding any of a wide variety of well known baits such as, but not limited to, a natural or artificial worm, a kernel of corn, a piece of meat, a salmon or other fish egg, a minnow, a marshmallow, or the like (also not shown). Curved bend 18 of fishhook 10 is generally bounded or subtended by, and lies within a plane defined by, an acute angle A having an origin B located in the vicinity of eyelet 14 of first end 12. However, free end 20, particularly point 22, projects outwardly of or is otherwise located outside of angle A and an area defined by curved bend 18, to facilitate or increase the possibility of impaling or hooking the lip or mouth tissue of a fish when the fish attempts to bite or swallow the bait, or when an angler pulls to tugs on the line to "set" the hook, which is a common, well known practice. While the location of free end 20 and point 22 outwardly of angle A as shown increases the possibility of hooking a fish that bites or swallows the bait, and setting the hook, it also increases the possibility or risk of puncturing the skin or other portion of a person contacted thereby during such activities as handling fishhook 10 for baiting or attaching the fishhook to a line, and also when the fishhook is being cast or retrieved. Thus, the position and also the outward orientation of point 22 and free end 20 present a substantial danger of injury, particularly when fishhook 10 is handled and cast or retrieved by an inexperienced person, such as a child, and when used in an environment wherein others such as other children, onlookers and the like are close by.

FIG. 2 shows a safety fishhook 26 constructed and operable according to the teachings of the present invention which addresses and overcomes the above dangers, like parts of fishhook 26 and fishhook 10 being identified by like numbers. Fishhook 26 includes a first end 12 having an eyelet 14 adapted for attachment to a fishing line in the well known conventional manner, and a shank 16. Fishhook 26 includes a curved bend 28 extending from shank 16 to a free end 30. Curved bend 28 is at least generally coplanar with free end 30 and preferably also shank 16, and partially encloses and defines a generally planar area 32. Free end 30 terminates at a single terminal end 34 located essentially within or on the periphery of planar area 32. One end of curved bend 28 and first end 12 are bounded by a line X lying on the plane of curved bend 28 and free end 30, and the opposite end of curved bend 28 (and shank 16) is bounded by a line Y which also lies on the plane and intersects line X at a point D near or in the vicinity of first end 12, for instance, at the location shown. A line Z also lies on the plane of curved bend 28 and extends at a 90 degree or right angle to line X. Free end 30 is bounded by line Z and extends toward curved bend 28 at at least about a 90 degree angle to line X so as to extend at least somewhat away from first end 12. This orientation is a desirable feature from a safety standpoint, because when fishhook 26 is pulled or dragged by first end 12, free end 30 is not directed or pointing in the direction of movement, thereby substantially decreasing the risk of impaling, puncturing, or cutting an object or surface over which the fishhook 26 is moved. That is, fishhook 26 provides the advantage over prior art fishhook 10 of terminal end 34 being located safely inwardly of curved bend 28 and pointing away from first end 12, such that fishhook 26 can be dragged in the usual manner by eyelet 14 generally along a line lying within angle C or otherwise brought into contact with a person's skin or other surface without danger of snagging, cutting, or puncturing the skin or other surface or otherwise injuring it, while still maintaining a bait on free end 30 in position for luring a fish to bite the bait and resultantly being hooked or impaled on terminal end 34. Because of the generally inwardly directed orientation of terminal end 34 (and generally away from first end 12), it serves much the same function as barb 24 of prior art hook 10, that is, hooking or impaling a fish's mouth or lip for holding the fish, but because no outwardly directed (more toward first end 12) sharp point 22 is present, the attendant dangers thereof as explained above are avoided.

FIG. 2a is an end view of fishhook 26, showing the generally coplanar relationship of shank 16, curved bend 28 and free end 30.

FIG. 2b is another end view of fishhook 26 showing eyelet 14 of free end in an alternative orientation extending out of the plane of the curved bend 28 (FIG. 1) and the shank 16.

FIG. 3 shows a safety fishhook 36 also constructed and operable according to the teachings of the present invention to provide the safety advantages just discussed, like parts of fishhook 36 and fishhooks 10 and 26 being identified by like numbers. Fishhook 36 includes a first end 12 having an eyelet 14 adapted for attachment to a fishing line in the well known conventional manner, and a shank 36. Fishhook 36 includes a curved bend 40 extending from shank 38 to a free end 30 so as to define and partially enclose a generally planar area 32, free end 30 terminating at a single terminal end 34 extending into and located essentially within area 32. Curved bend 28 is at least generally coplanar with free end 30. One end of curved bend 28 and first end 12 are bounded by a line X lying in the plane of curved bend 28 and free end 30, and the opposite end of curved bend 28 is bounded by a line Y, also in the plane, which intersects line X at a point F near or in the vicinity of first end 12, for instance, at the location shown. A line Z also lies on the plane of curved bend 40 and extends at a 90 degree or right angle to line X. Free end 30 is bounded by line Z and extends toward curved bend 28 at at least about a 90 degree angle to line X so as to extend at least somewhat away from first end 12. Again, like fishhook 26, fishhook 36 provides the advantage over prior art fishhook 10 of terminal end 34 being directed or oriented in a safe direction toward curved bend 40, such that fishhook 36 can be dragged by eyelet 14 generally along a line lying within angle E, or otherwise brought into contact with a person's skin or another surface without danger of snagging or puncturing the skin or other surface or otherwise injuring it.

FIG. 4 shows another safety fishhook 42 constructed and operable according to the teachings of the present invention to provide the above advantages, like parts of fishhook 42 and fishhooks 10, 26 and 36 being identified by like numbers. Fishhook 42 includes a first end 12 having an eyelet 14 adapted for attachment to a fishing line, a free end 30 opposite first end 12, and a curved bend 44 disposed between first end 12 and free end 30 terminating at a terminal end 34, curved bend 44 defining a partially enclosed, generally planar area 32 into which free end 30 is directed or projects. Curved bend 28 and free end 30 are preferably at least generally coplanar, as illustrated in FIG. 2a. Curved bend 44 includes a first curved portion 46 having a first radius of curvature $R_1$ and a second curved portion 48 having a second radius of curvature $R_2$, first curved portion 46 being located closer to first end 12 and second curved portion 48 being located closer to free end 30, first radius of curvature $R_1$ being variable but still generally larger than second radius of curvature $R_2$ which is more abrupt. Curved bend 44 is bounded on one end by a line X lying on the plane of curved bend 44 and on an opposites end by line Y, also on the plane, which lines intersect at a point F near first end 12 to form an acute angle E. A line Z also lies on the plane of curved bend 44 and extends at a 90 degree or right angle to line X. Free end 30 is bounded by line Z and extends toward curved bend 44 at at least about a 90 degree angle to line X so as to extend at least somewhat away from first end 12. Free end 30 is bounded by line Z, also in the plane, which intersects line X at about a 90 degree or right angle, and extends in a direction toward curved bend 28. Again, as a result, fishhook 42 provides the safety advantages discussed above with regard to the other embodiments of the invention. Additionally, a relatively large opening 50 compared to the openings of fishhooks 26 and 36 is provided in communication with area 32, which allows a bait on hook 42 close to free end 30 to be more easily received in a fish's mouth, while free end 30 is still positioned sufficiently inwardly of second curved portion 48 to largely avoid puncturing or otherwise injuring the skin or another surface that the fishhook may contact or be dragged over, as explained above.

Referring to FIG. 5, another fishhook 52 constructed and operable according to the present invention is shown, like parts of fishhook 52 and fishhooks 10, 26 36, and 42 being identified by like numbers. Fishhook 52 includes a first end 12 having an eyelet 14 adapted for attachment to a fishing line, a free end 30 including a terminal end 34 opposite first end 12, an elongate shank 54 and a curved bend 28 disposed between first end 12 and free end 30, curved bend 28 defining a partially enclosed, generally planar area 32. Curved bend 28 is again at least generally coplanar with free end 30, as illustrated in FIG. 2a. Curved bend 28 and first end 12 are bounded on one end by a line X lying in the plane of the curved bend and on an opposite end by a line Y, also in the plane, which lines intersect at a point D near first end 12 such that curved bend 28 is subtended or contained by an acute angle C. Free end 30 extends toward curved bend 28 at at least about a 90 degree or right angle to line X, as illustrated by the relationship of free end 30 to the line Z which bounds free end 30 and is oriented at a right angle to line X, to provide the above-discussed safety effect. Also, terminal end 34 of free end 30 is located near a center of central region of angle C, as denoted by the line W which bisects angle C.

FIG. 6 shows another fishhook 56 constructed and operable according to the present invention, like parts of fishhook 56 and fishhooks 10, 26 36, 42, and 52 being identified by like numbers. Fishhook 56 includes a first end 12 having an eyelet 14 adapted for attachment to a fishing line, a free end 30 opposite first end 12, an elongate, curved shank 58 and a curved bend 28 disposed between first end 12 and free end 30, curved bend 28 defining a partially enclosed, generally planar area 32, free end 30 being at least generally coplanar with curved bend 28. Free end 30 terminates at a single terminal end 34 located essentially within or on the periphery of planar area 32. One end of curved bend 28 and first end 12 are bounded by a line X lying in the plane of curved bend 28 and free end 30, and the opposite end of curved bend 28 (and shank 58) is bounded by a line Y which intersects line X at a point D near or in the vicinity of first end 12, for instance, at the location shown, forming an angle C. A line Z also lies on the plane of curved bend 28 and extends at a 90 degree or right angle to line X. Free end 30 is bounded by line Z and extends toward curved bend 28 at at least about a 90 degree angle to line X so as to extend at least somewhat away from first end 12.

Free end 30 is joined to curved bend 28 at a relatively abrupt bend 60. The more abrupt shape of bend 60 of fishhook 56, as well as the abrupt shape of second curved portion 48 of fishhook 42 (FIG. 4), are important features as they serve to hold and maintain a small bait such as a kernel of corn in a position close to or over terminal end 34 with less chance of slippage down the fishhook compared to when a more gradual bend is used, particularly as the fishhook is dragged through the water, yet they position the bait close to the outer periphery of the fishhook as defined by the angle C (FIG. 6) and the angle E (FIG. 4) to maximize the opportunity for luring and hooking a fish, without unduly increasing the risk of puncture or other injury in the event the fishhook comes in contact with a person's skin or the like.

Here, it should be understood that as another advantage of the present invention, the terminal ends 34 of the fishhooks of the present invention can be as sharp or as blunt as desired for a particular application or use, while still being adequate for catching a fish. For instance, for a beginning or child angler, terminal end 34 can be relatively blunt, so as to even further minimize the possibility of injury, particularly while baiting or otherwise directly handling the fishhook. Another advantage of a blunter terminal end is that it is less likely to impale a fish's mouth area, thereby making unhooking the fish easier and reducing the possibility of injury to the fish. This latter advantage is particularly helpful when the fish are contained such as in a small pool or the like and it is desired to catch each fish more than once, for instance when teaching children to fish. For more advanced anglers, sharper terminal ends can be used as desired. Also, it should be recognized that because no point extending toward the first or attached end of the present fishhooks is provided, the present fishhooks are not "set" in the traditional manner by tugging or pulling the fishing line. This may result in fewer fish being caught or "getting away", but is contemplated as an advantage when teaching a person to fish in that less injury to the mouth of the fish is likely to occur. In this regard, it should be recognized that terminal end 34 of the present fishhooks can extend into space 32 in any of the embodiments shown to a desired extent, such as to or past a central region of an angle such as the angles C or E above which subtends the curved bend of the hook, to increase or decrease the propensity of the hook for catching a fish.

Thus there has been shown and described several novel embodiments of a safety fishhook according to the present invention which overcomes many of the problems set forth above. It will be apparent, however, to those familiar in the art, that many changes variations, modifications and other uses and applications for the subject device are possible. All such changes, variations, modifications, and other uses and applications that do not depart from the spirit and scope of the invention are deemed to be covered by the invention which is limited only by the claims which follow.

What is claimed is:

1. A safety fishhook formed from a wire, consisting:
    a first end adapted for attachment to a line;
    a shank adjacent to the first end; and
    a curved bend extending from the shank to a second end which is to be a free end, the first end and the curved bend being bounded by a first line tangent to a surface of the first end and a surface of a portion of the curved bend adjacent to the second end, the second end terminating at a single terminal end extending toward said curved bend at an angle to said line of at least about 90 degrees.

2. The safety fishhook of claim 1, wherein the curved bend is bounded by a second line which intersects the first line in the vicinity of the first end forming an angle, the second end terminating at a location within a central region of the angle.

3. The safety fishhook of claim 1, wherein the curved bend includes a first curved portion having a first radius of curvature and a second curved portion having a second radius of curvature, the first curved portion being located along the curved bend closer to the first end and the second curved portion being located closer to the second end, the first radius of curvature being greater than the second radius of curvature.

4. The safety fishhook of claim 1, wherein the terminal end has a single point extending toward the curved bend.

5. The safety fishhook of claim 1, wherein the curved bend is substantially planar defining a partially enclosed planar area and the second end extends into said planar area.

6. The safety fishhook of claim 1, wherein the second end comprises a pointed terminal end and a curved portion located closer to the first end than said terminal end.

7. A safety fishhook formed of a wire, consisting:
    a first end adapted for attachment to a fishing line; and
    a curved bend extending from the first end to a second end which is to be a free end, the curved bend and the second end being substantially coplanar, the first end and the curved bend being bounded by a first line lying on the plane of the curved bend and the second end, the first line being tangent to a surface of the first end and a surface of a portion of the curved bend adjacent to the second end, the second end terminating at a single terminal end extending toward said curved bend at an angle to said first line of at least about 90 degrees, such that when the fishhook is dragged by the first end along a surface of an object on which the line lies the second end will not contact said surface, and the second end after puncturing an object, can be easily removed from the object without further damaging the object.

8. The safety fishhook of claim 7, wherein the curved bend is bounded by a second line which intersects the first line near the first end forming an angle, the second end terminating at the terminal end nearer to a center of the angle than to the curved bend.

* * * * *